(No Model.)
A. H. BEACH.
Fifth Wheel Platform.
No. 231,469. Patented Aug. 24, 1880.
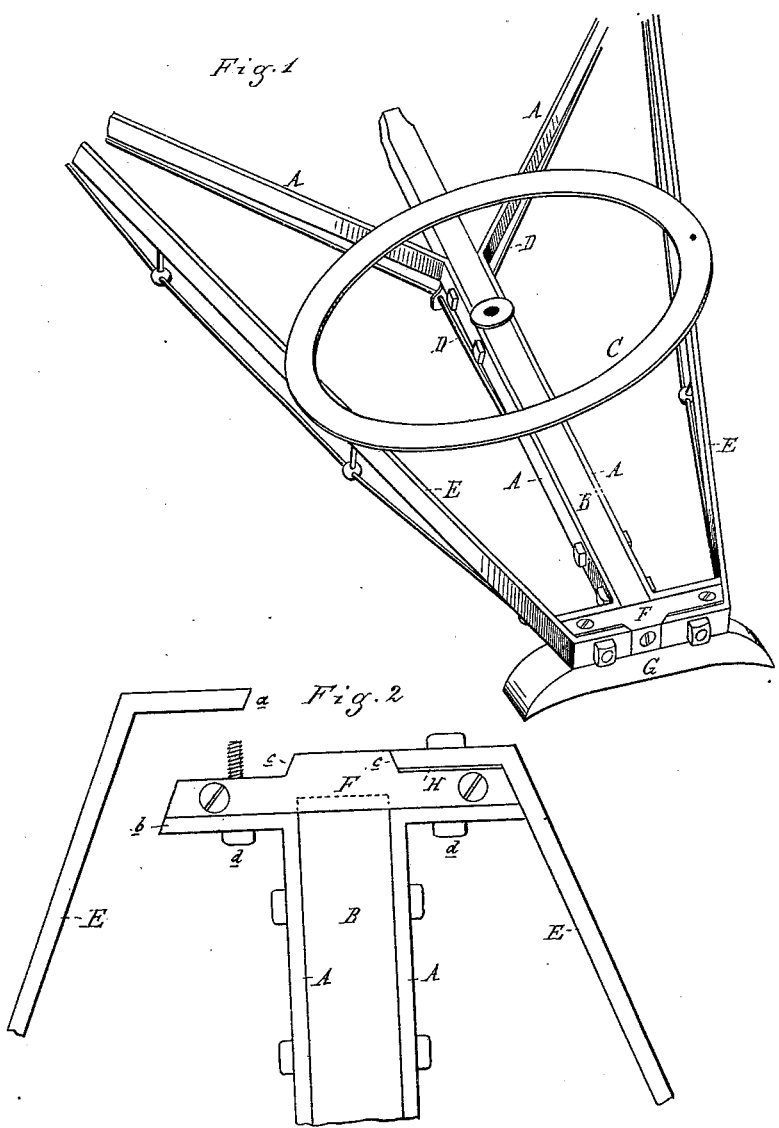
Attest:
A. Barthel
H. Stanley
Inventor:
A. H. Beach
By atty
Geo. L. Sprague

UNITED STATES PATENT OFFICE.

ALEXANDER H. BEACH, OF LINDEN, MICHIGAN.

FIFTH-WHEEL PLATFORM.

SPECIFICATION forming part of Letters Patent No. 231,469, dated August 24, 1880.

Application filed April 15, 1880. (No model.)

*To all whom it may concern:*

Be it known that I, ALEXANDER H. BEACH, of Linden, in the county of Genesee and State of Michigan, have invented an Improvement in Fifth-Wheel Platforms, of which the following is a specification.

The object of my invention is to make similar platforms such as are described in Letters Patent of the United States issued to me July 25, 1876, and others of a similar character, more durable without increase of weight or cost of manufacture, and more easy to repair when accidentally broken or damaged.

The invention consists in the peculiar construction of the parts and of their various combinations, as more fully hereinafter described.

Figure 1 is a perspective view of my improved platform. Fig. 2 is an enlarged plan view of the head section with one of the outside futchells detached.

Like letters indicate like parts in each figure.

In the accompanying drawings, which form a part of this specification, A A represent the inner futchells, B a central bar, C the fifth-wheel, and D the trusses, constructed and arranged as shown, and as fully set forth in the aforesaid Letters Patent, except as hereinafter described.

E represents the outside futchells, which are not made in one piece, as heretofore, but in two pieces, as shown, bent into the form shown, with the ends which form a part of the head terminating in the bevel-surfaces $a$, which are in the same parallel plane with the side futchells proper, and with the ends of the head-block F, and with the beveled ends $b$ of the inside futchells.

The head-block F, to which the spring-block G is secured, is made of iron, preferably malleable, with its ends beveled, as shown. It has two offsets, $c$, with beveled ends, the offsets being the same thickness as the inwardly-turning ends of the outside futchells. The head is also recessed to receive a tenon on the end of the center bar, B, to more effectually prevent the latter from turning.

H is a piece of rubber or other suitable flexible material interposed between the parts, as shown, and the head and outside and inside futchells are secured together by the bolts $d$, which, when the nuts on said bolts are turned up tight, draw the parts together so that the beveled parts are brought into rigid contact, thereby each of such parts thoroughly bracing the other.

By this construction, should one side of the inside futchells become accidentally damaged or broken the side so damaged may be easily removed for repairs, while, when the outside futchells are made V-shaped and in one continuous piece, such repair cannot be made without taking the whole structure to pieces.

The wooden filling-block which is used with the continuous outside futchells, and which so rapidly wears, and which is so readily affected by the elements, is dispensed with, to the great benefit of the whole device.

What I claim as my invention is—

1. In a fifth-wheel running-gear for vehicles having outside futchells made in two pieces, the iron head-block F, in combination with the futchells E E, passing around the ends and on the outside of said head-block and bracing it, inside futchells, A A, and bolts $d$, passing through the head and the inside and outside futchells, substantially as described, and for the purpose set forth.

2. In a fifth-wheel running-gear for vehicles having outside futchells made in two pieces, the head-block F, of iron, in combination with the inside futchells, A, bolts $d$, and flexible pieces H, substantially as and for the purposes specified.

3. In a fifth-wheel running-gear for vehicles having outside futchells made in two pieces, the head-block F, of iron, in combination with the inside futchells, A, bolts $d$, flexible pieces H, and central bar, B, the end of which is mortised into said head-block, substantially as and for the purposes set forth.

4. In a fifth-wheel running-gear for vehicles having outside futchells made in two pieces, the head-block F, of iron, in combination with the inside futchells, A, bolts $d$, flexible pieces H, central bar, C, the end of which is mortised into said head-block, and the trusses D, substantially as and for the purposes described.

ALEXANDER H. BEACH.

Witnesses:
H. S. SPRAGUE,
CHARLES J. HUNT.